Dec. 26, 1961 E. F. MORENO ETAL 3,014,736
TRANSVERSE SPRING AND AXLE ASSEMBLY
Filed Aug. 1, 1960 2 Sheets-Sheet 1
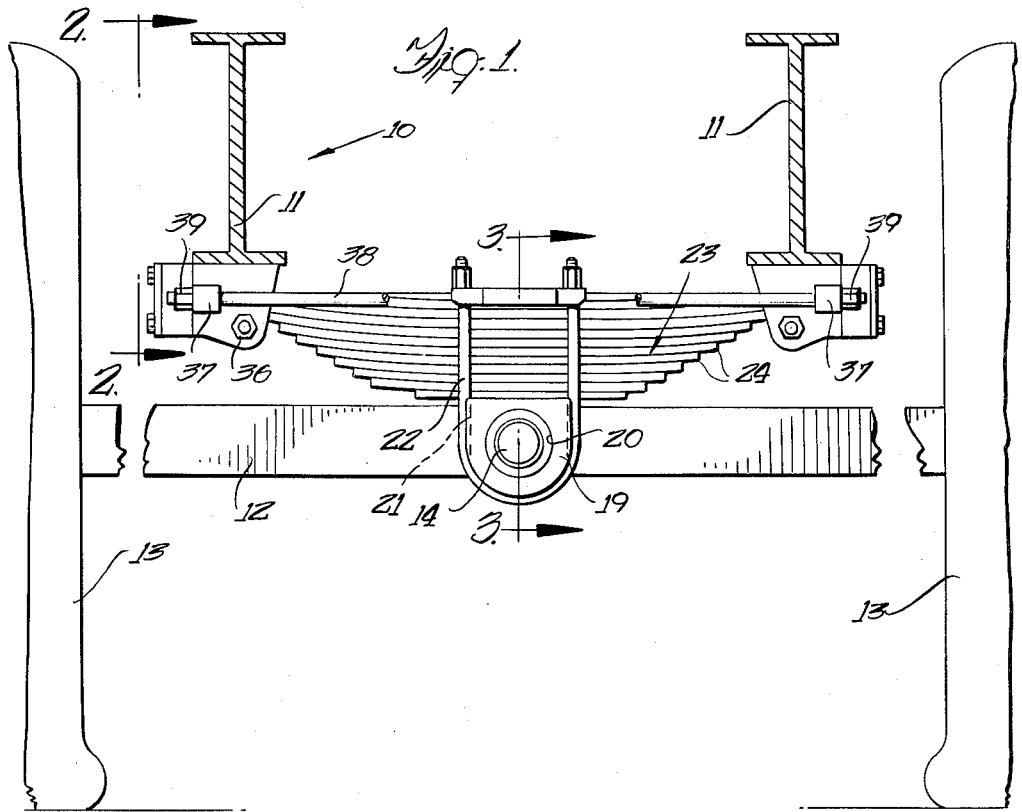
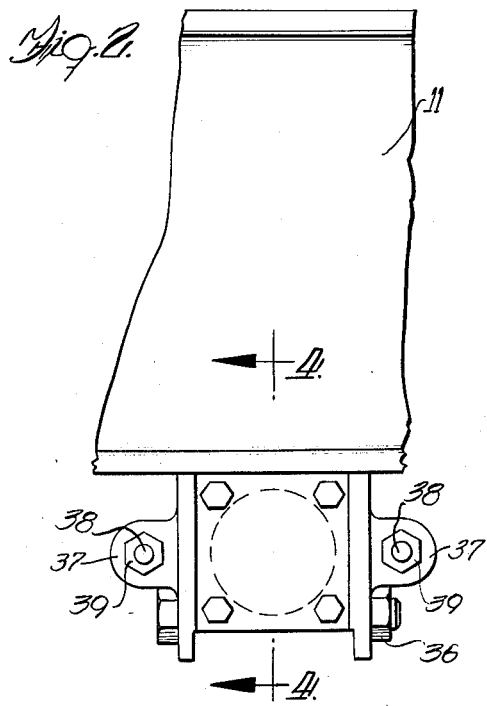
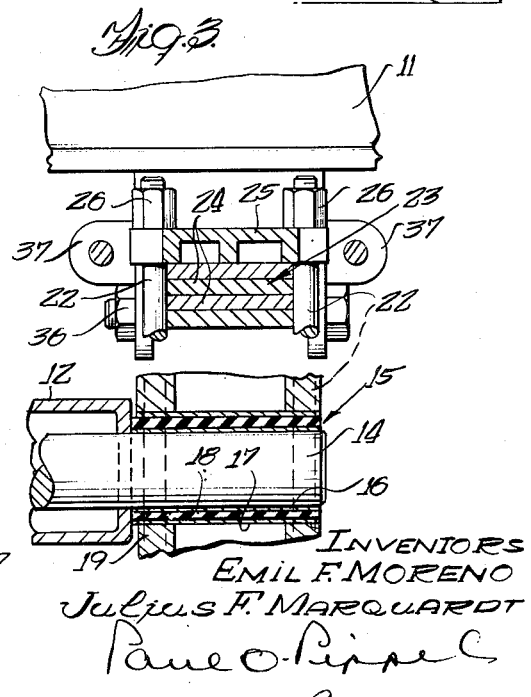
INVENTORS
EMIL F. MORENO
JULIUS F. MARQUARDT
Paul O. Pippel
ATTORNEY

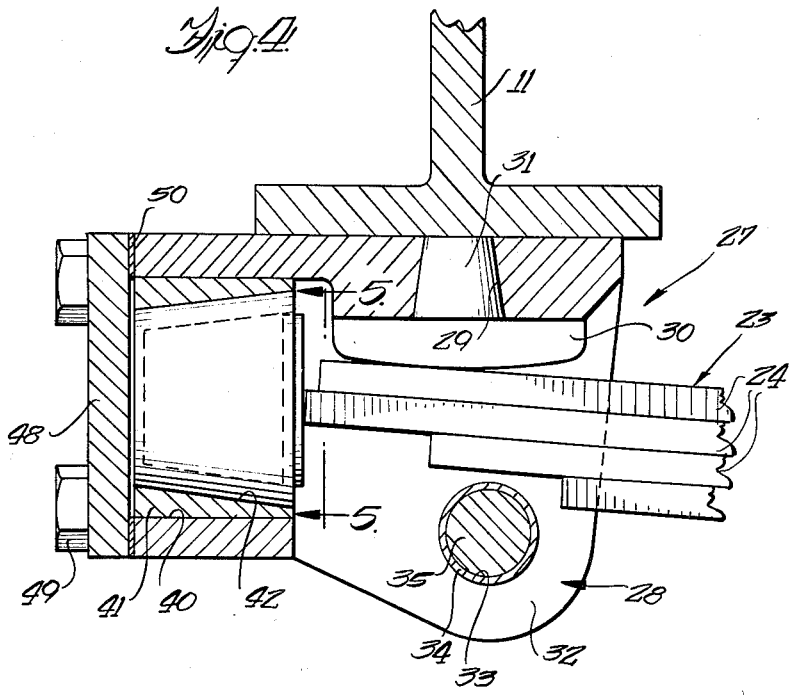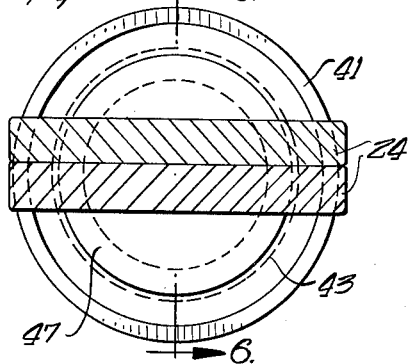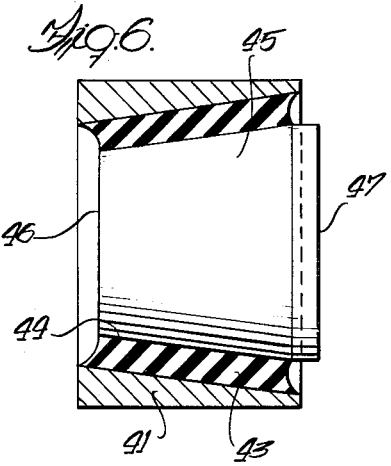

United States Patent Office 3,014,736
Patented Dec. 26, 1961

3,014,736
TRANSVERSE SPRING AND AXLE ASSEMBLY
Emil F. Moreno, Melrose Park, and Julius F. Marquardt, Westchester, Ill., assignors to International Harvester Company, Chicago, Ill., a corporation of New Jersey
Filed Aug. 1, 1960, Ser. No. 46,729
2 Claims. (Cl. 280—112)

This invention relates to a spring suspension for vehicles. More specifically, the invention relates to an improvement in a transverse spring and axle assembly.

A prime object of this invention is to provide an improved transverse leaf spring construction utilized in connection with an axle assembly, the said construction including improved means for centering the axle and spring assembly with respect to the vehicle.

A still further object of the invention is to provide an improved transverse spring suspension for vehicles, the said spring suspension including an improved construction for connecting the transverse spring to a chassis and for transmitting side loads and road shocks from the axle to the frame.

A still further object of the invention is to provide an improved transverse spring suspension for vehicles, the said suspension including a construction which will center the spring suspension with respect to the chassis frame and which will supply a certain pre-loading to opposite ends of the leaf spring assembly whereby any tendency for the axle to shift relative to the chassis from one side to the other is greatly reduced.

Still another object of the invention is to provide an improved transverse spring construction including an improved bracket arrangement connected to the chassis and cooperating with the leaf spring assembly to facilitate the absorption of side movement and side shocks of the axle with respect to the vehicle frame.

A further object of the invention is to provide an improved transverse spring suspension including an improved bracket construction for absorbing side thrusts encountered by the axle and having an improved resilient sleeve and thrust plug connection designed to center the spring assembly and to eliminate undesirable stresses thereby preventing breakage of the leaf spring.

These and other objects will become more readily apparent from a reading of the description when examined in connection with the accompanying sheet of drawings.

In the drawings:

FIGURE 1 is a cross-sectional view through a vehicle chassis and improved spring suspension;

FIGURE 2 is an enlarged view taken substantially along the line 2—2 of FIGURE 1 showing an improved bracket construction for supporting one end of a leaf spring assembly;

FIGURE 3 is an enlarged cross-sectional view taken substantially along the line 3—3 of FIGURE 1;

FIGURE 4 is a cross-sectional view taken substantially along the line 4—4 of FIGURE 2;

FIGURE 5 is a cross-sectional view taken substantially along the line 5—5 of FIGURE 4; and FIGURE 6 is a sectional view taken along the line 6—6 of FIG. 5 showing a sleeve and thrust plug assembly utilized in connection with brackets, one of which is best shown in FIGURE 4.

A vehicle chassis is generally designated by the reference character 10 and comprises a pair of longitudinally extending and transversely spaced frame members of I-beam construction and designated at 11. As best shown in FIGURE 1, the vehicle chassis 10 is supported by means of an axle 12 suitably connected to ground wheels 13. The axle 12 has a forwardly extending longitudinal pivot pin 14 on which, as best shown in FIGURE 3, a sleeve 15 is positioned. The sleeve 15 comprises an inner cylinder 16 which is in mating relation with respect to the pivot pin 14, the sleeve also including an outer cylinder 17 of relatively thin metal which has suitably bonded therebetween a rubber-type sleeve member 18. A U-bolt block 19 comprises a bore 20 within which the sleeve 15 is seated. The U-bolt block 19 also comprises a pair of longitudinally spaced arcuate grooves which serve to provide a seat for U-bolts 22. A leaf spring assembly 23 consists of a plurality of spring leaves 24 of varying length and the leaf spring assembly 23 is secured to the longitudinal pivot pin 14 by means of the U-bolts 22 which cooperate with a U-bolt attaching plate 25 and nuts 26 to securely retain the spring assembly 23 on the longitudinal pivot 14. A spring mounting structure is generally designated at 27 and comprises a pair of brackets 28 which may be suitably secured to the lower ends of the I-frame members 11 by welding, etc. Each bracket 28 comprises a vertically extending frusto-conical bore 29. Each bracket 28 supports a spring-engaging pad 30 having a frusto-conical stem which is inserted in the frusto-conical bore 29.

The bracket 28 also comprises a pair of downwardly projecting spaced plates 32 provided with aligned openings 33 which carry a sleeve 34 having a transversely extending bolt 35 contained therein. The bolts 35 of each bracket 28 are suitably secured by means of nuts 36.

Each bracket is provided with a pair of laterally projecting ears 37 which suitably support a tie rod 38 secured to said ears 37 by means of nuts 39. Referring now particularly to FIGURE 4, each bracket 28 includes a socket designated at 40. A sleeve 41 is normally disposed within the said socket 40. The sleeve 41 comprises an inner frusto-conical bore 42 having supported therein a frusto-conical sleeve 43 which may consist of rubber, neoprene, or other resilient compound.

A frusto-conical plug 45 is disposed within the frusto-conical bore 44 of the rubber sleeve 43. The plug 45 comprises a thrust end 46 and a spring-engaging end 47. A thrust plate 48 is connected to each of the brackets 28 over the end of the sleeve 41 by means of suitable screws 49. A shim 50 may be interposed between the thrust plate 48 and the ends of the bracket 28 as indicated.

The axle 12 is free to pivot about a longitudinal axis about the pivot pin 14. Each of the plugs 45 are urged inwardly so that the spring engaging thrust ends 47 engage the second leaf 24 of the leaf spring assembly 23. The first leaf 24 of the assembly is in engagement with the pads 30. Since the plugs 45 exert an inward thrust, they are effective to center the assembly 23 with respect to the frame members 11 of the chassis 10. As the leaves 24 are more curved, as for instance in the unloaded condition, the assembly is nevertheless centered by means of the novel plug arrangement 45. As the chassis is loaded, the leaf springs straighten out and thus push outwardly on the plugs 45 whereupon there is a slight space between the thrust plate 48 and the thrust end 46 of each plug 45. The shim 50 may be utilized to provide this clearance and one or more may be utilized for this purpose. Thus a small amount of clearance is provided so that the leaves 24 may straighten out as desired during loading. The bolts 35 provide stops at the lower ends of the brackets 28 for the leaf spring assembly.

During operation of the vehicle, side thrusts are absorbed and cushioned by means of the rubber sleeve 43 and the thrust plates 48 are engaged during severe side movement. The type of construction shown eliminates the needs of having shackles at both ends of a transverse spring or thrust blocks. Thus a simplified and less expensive construction results. Also the type of construction shown prevents excessive spring failure by virtue of the fact that the spring assembly 23 is centered at all times or pre-loaded by means of the plugs 45.

The weight of the chassis is transmitted to the spring assembly through the spring pads which are mounted in the brackets. Thus the weight of the vehicle is transmitted from the frame to the suspension and then to the ground. Shock loads are softened by virtue of the rubber sleeves.

Further, the tension rods 38 serve to maintain the frame members 11 against outward movement, thus assuring proper positioning at all times of the brackets 28 relative to the spring assembly.

Thus the objects of the invention have been fully achieved and an improved spring suspension has been disclosed. It is understood that changes and modifications may be made without departing from the spirit of the invention or the scope thereof as defined in the appended claims.

What is claimed is:

1. In a vehicle having a transversely extending axle structure, transversely spaced frame members, a transversely extending leaf spring, and means pivotally connecting said leaf spring to said axle structure for pivotal movement about a longitudinal axis, a mounting structure for connecting said leaf spring to said frame members comprising; a pair of brackets supported on said frame members adjacent opposite ends of said leaf spring, each bracket including a cylindrical socket, a supporting pad on each bracket engaging opposite ends of said leaf spring for supporting said frame members on said leaf spring, a stop member on each bracket disposed below said leaf spring to limit relative vertical movement of said leaf spring and said brackets, a cylindrical sleeve disposed in each socket, each sleeve having an inner frusto-conical bore terminating in a narrow portion at one end and a wider portion at an opposite end adjacent opposite ends of said leaf spring, a frusto-conical plug having a spring engageable wide end and a narrow thrust end, a frusto-conical resilient member having inner and outer frusto-conical walls, said resilient member being disposed around said plug and positioned within said bore, a thrust plate connected to each of said brackets adjacent the narrow portion of said sleeves, said resilient member urging said plug wide ends against opposite ends of said leaf spring, said thrust ends of said plugs engaging said thrust plates during relative transverse movement of said axle and frame members, and a transversely extending tie rod connecting said brackets.

2. In a vehicle having a transversely extending axle structure, a vehicle chassis, a transversely extending leaf spring, and means pivotally connecting said leaf spring to said axle structure for pivotal movement about a longitudinal axis, a mounting structure for connecting said leaf spring to said chassis comprising; a pair of brackets supported on said chassis adjacent opposite ends of said leaf spring, each bracket including a cylindrical socket, means on each bracket engaging opposite ends of said leaf spring for supporting said frame members on said leaf spring, a stop member on each bracket disposed below said leaf spring to limit relative vertical movement of said leaf spring and said brackets, a cylindrical sleeve disposed in each socket, each sleeve having an inner frusto-conical bore terminating in a narrow portion at one end and a wider portion at an opposite end adjacent opposite ends of said leaf spring, a frusto-conical plug having a spring engageable wide end and a narrow thrust end, a frusto-conical resilient member having inner and outer frusto-conical walls, said resilient member being disposed around said plug and positioned within said bore, a thrust plate supported on each of said brackets adjacent the narrow portion of said sleeves, means adjustably connecting said thrust plates to said brackets whereby said thrust plates may be moved axially toward and away from said sockets, said resilient member urging said plug wide ends against opposite ends of said leaf spring, said thrust ends of said plugs engaging said thrust plates during relative transverse movement of said axle and chassis, and means interconnecting said brackets to restrain said brackets from relative outward movement.

References Cited in the file of this patent

UNITED STATES PATENTS

| | | |
|---|---|---|
| 1,288,757 | Timm | Dec. 24, 1918 |
| 1,589,611 | Masury | June 22, 1926 |
| 2,482,488 | Julien | Sept. 20, 1949 |
| 2,831,675 | Norrie | Apr. 22, 1958 |